United States Patent [19]

Klien et al.

[11] 4,267,200
[45] May 12, 1981

[54] AGGREGATED MIXED-MOISTURE FLAKED COFFEE OF HIGH AROMA

[75] Inventors: Caren A. Klien, Wyoming; Donald R. Gieseker, Cincinnati, both of Ohio

[73] Assignee: The Procter & Gamble Company, Cincinnati, Ohio

[21] Appl. No.: 955,054

[22] Filed: Oct. 26, 1978

[51] Int. Cl.² ............................................. A23F 1/00
[52] U.S. Cl. ..................................... 426/595; 426/388
[58] Field of Search ........................ 426/594, 595, 388

[56] References Cited

U.S. PATENT DOCUMENTS

| | | | |
|---|---|---|---|
| 3,615,667 | 10/1971 | Joffee | 426/388 |
| 3,660,106 | 5/1972 | McSwiggin et al. | 426/595 X |
| 3,769,031 | 10/1973 | McSwiggin | 426/388 X |
| 3,769,032 | 10/1973 | Lubsen et al. | 426/388 X |
| 4,110,485 | 8/1978 | Grubbs et al. | 426/595 |

Primary Examiner—Joseph M. Golian
Attorney, Agent, or Firm—Rose Ann Dabek; Julius P. Filcik; Richard C. Witte

[57] ABSTRACT

Aggregated coffee flake particles comprise a plurality of compressed coffee flakes bonded together wherein at least one of which is a low-moisture flake (1% to 3.5% by weight) and at least one of which is a high-moisture flake (4.5% to 7% by weight) are disclosed. The composite flake particles range in thickness from 9 to 16 mils. The flaked coffees provide improved extractability of the water-soluble flavor constituents, exhibit high initial aroma levels, and exhibit high bed permeability. Also disclosed is a process for preparing aggregated mixed-moisture flaked coffee. The process comprises: (1) separately cold-grinding dual streams of roast coffee, relatively high-moisture and low-moisture, respectively; (2) combining of the two ground coffee streams to provide a roll mill feed having a specified particle size distribution and average moisture content, and (3) passing the coffee feed through a roll mill under specific conditions, and (4) screening the roll-milled, aggregated flaked coffee to produce a product such that no more than 60% by weight passes through a 30-mesh U.S. Standard screen.

10 Claims, 2 Drawing Figures

AGGREGATED MIXED-MOISTURE FLAKED COFFEE OF HIGH AROMA

BACKGROUND OF THE INVENTION

1. Technical Field

The present invention relates to roast and ground coffee products comprising aggregated coffee flake particles which comprise a plurality of compressed coffee flakes bonded together. The aggregated flake coffee products provide improved extractability of the water-soluble flavor constituents, superior initial aroma levels and acceptable bed permeabilities. The present invention also relates to a novel process for preparing the aggregated flake coffee particles by the roll milling of a cold processed coffee feed blend of ground coffees having differing moisture contents under particular roll mill operating conditions.

2. Background Art

Roast and ground coffee which has been transformed into flaked coffee by roll milling the roast and ground coffee is known in the art (see, for example, U.S. Pat. No. 1,903,362, issued Apr. 4, 1933 to R. B. McKinnis, and U.S. Pat. No. 2,368,113, issued Jan. 30, 1945 to C. W. Carter). An improved flaked roast and ground coffee of enhanced extractability is disclosed by Joffe in U.S. Pat. No. 3,615,667, issued Oct. 26, 1971, as well as a method for its production in U.S. Pat. No. 3,660,106, issued May 2, 1972 to J. R. McSwiggin et al.

Art attempts are realizing superior roast coffee products have included improving other coffee attributes in addition to improving the extractability of those flavorful water-soluble coffee constituents often referred to as coffee brew solids. A visually appealing, high-sheen flaked roast and ground coffee of improved extractability of its brew solids is disclosed in U.S. 4,110,485, issued Aug. 29, 1978 to D. R. Grubbs. A flaked coffee product with large visually distinctive flakes can be prepared by flaking a mixture of two roast and ground coffee blends of equal weight fractions. The two coffee blends differ only in their moisture content; one being a high moisture (5.0% by weight) coffee, and one being a low moisture coffee (3% by weight).

While flaking can provide roast coffee in a form which provides certain benefits such as increased extractability and can be used to provide visually distinctive coffee products, coffee flaking can detrimentally affect certain attributes of roast and ground coffee. Flaking is known, for example, to reduce the initial aroma level of packaged coffee as well as to affect the quality of the aroma. To minimize the aroma penalty exacted by flaking, mixtures of conventional roast and ground coffee and of flaked coffee have been formulated (see, for example, U.S. Pat. No. 3,615,667 issued Oct. 26, 1971 to F. M. Joffe). However, such mixtures merely trade off increased initial aroma for increased extractability when conventional roast and ground coffee which has a higher aroma level is substituted for flaked coffee which has higher extractability.

The initial aroma level of flaked coffee could be increased by the simple addition of a highly aromatized carrier oil such as is disclosed in U.S. Pat. No. 3,769,032, issued Oct. 30, 1973 to Lubsen et al. Such an addition, however, would undesirably increase the oil level of the coffee itself as well as any coffee brew made therefrom. Moreover, the aroma material from relatively large quantities of donor coffee must be collected in order to aromatize small quantities of flaked coffee.

A variety of non-donative or unadulterating aromatization methods are known in the art for increasing the aroma of roast and ground coffee. Typically, these methods involve reducing the working temperature of coffee at various stages of processing such as grinding. The cooler working temperatures reduce losses of the volatile aroma materials during these steps (see, for example, U.S. Pat. No. 1,924,059, issued Aug. 22, 1933 to W. Hoskins). These cold grinding processes for conserving aroma have not been applied to minimizing the aroma losses of flaked coffee, apparently, because, as noted above, flaking is known to reduce the level of coffee aroma. Thus, any increase in the aroma of roast and ground coffee apparently would be lost during flaking. However, it has been surprisingly discovered that application of pre-flaking, non-donative aroma conservation methods such as cold processing can provide an increase in the initial aroma level of flaked coffee.

Such a combination of aroma conservation and flaking methods is, however, not made without certain difficulties. An unforeseen disadvantage associated with flaked coffee which has been cold processed is a dramatic decrease in the bed permeability of a coffee product produced. Such decreases in bed permeability lead to unacceptably long drain times needed to prepare coffee brews.

Given the state of the coffee flaking art as described above, there is continuing need for new and useful roast coffee products which provide increased extractability of the flavorful coffee brew solids and which possess high initial aroma levels. Accordingly, it is an object of the present invention to provide a flaked roast coffee product of increased extractability and enhanced initial aroma.

It is a further object of the present invention to provide roast coffee products of enhanced extractability and initial aroma which are substantially free of additive aroma carrier oils.

It is a further object of the present invention to provide flaked roast coffee products of enhanced extractability and initial aroma which have bed permeabilities great enough to provide acceptable coffee bed draining performance.

It has been surprisingly discovered that the above objects can be realized and superior flaked roast coffee products provided which exhibit both enhanced extractability and initial aroma levels as well as adequate bed permeability by formulating aggregated, mixed-moisture flaked coffee compositions. Such coffee compositions are realized by mixing a low-moisture roast and ground coffee fraction and a high-moisture coffee fraction, each of which has been cold processed to minimize coffee aroma losses, and thereafter flaking the roast and ground coffee mixed-moisture blend under particular roll mill conditions. The novel, mixed-moisture coffee flake aggregates produced surprisingly possess sufficient structural strength and integrity to provide bed permeability equivalent to non-cold processed flaked coffee.

DISCLOSURE OF INVENTION

The present invention relates to unadulterated, highly aromatic flaked coffee compositions which nonetheless exhibit normal drain time performance characteristics and to the process by which such compositions are prepared. The present roast coffee compositions comprise from about 80% to 100% by weight of coffee flake aggregates. The coffee flaked aggregates comprise a plurality of compressed coffee flakes bonded together. At least one of the coffee flakes in each aggregate is a low-moisture flake, having a moisture content of from about 1% to about 3.5% by weight. Additionally, at least one of said coffee flakes in each aggregate is a high-moisture flake, having a moisture content of from about 4.5% to 7% by weight of the high-moisture flake. The average moisture content is from about 3% to about 5% by weight of the coffee composition.

The balance of the present roast coffee compositions comprises other conventional coffee materials including conventional flaked coffee, high-sheen flaked coffee, and roast and ground coffee or the like, including grains.

The coffee flake aggregates have an average flake thickness of from about 0.009 to 0.016 in. The bulk density of the present coffee compositions range from about 0.395 g./cc. to 0.485 g./cc. The initial aroma intensity of the present compositions is about 20,000 G.C. total counts or above as measured by the procedure described herein.

The present invention also provides a process by which the above-described roast coffee compositions can be prepared. In the present process two separate green bean fractions are separately roasted and quenched with sufficient amounts of water such as to provide individual moisture contents of from about 1% to about 3.5% and from 4.5% to 7%, respectively, in conventional manner. Thereafter, each whole roast fraction is cooled to −5° F. to 5° F., and is separately ground so as to provide a low-moisture roast and ground coffee and a high-moisture roast and ground coffee respectively. Each of these fractions is within the temperature range of 20° F. to 40° F. after grinding. The high-moisture and low-moisture coffees are blended while maintaining the temperature of the coffee below 40° F., preferably within the range of 30° F. to 40° F. to form a mixed-moisture roll mill roast and ground coffee feed having an average moisture content of from about 3% to 5% by weight of the coffee feed. The roll mill coffee feed is then fed to a roll mill at a temperature of about 35° F. to 40° F. and at a feed rate of about 10 to 400 lbs./hr./in. The roll mill operates at a roll pressure of about 150 to 4000 lbs./linear in.; a roll temperature of from about 40° F. to 80° F.; a mechanical static gap of less than 0.001 in.; a roll peripheral speed of from about 470 to 1180 ft./min.; and a roll diameter of from about 6 to 48 inches. The aggregated, mixed-moisture flaked coffee falling from between the rolls is thereafter screened to adjust the final particle size distribution.

The present invention relates to flaked roast coffee compositions comprising particles of aggregated mixed-moisture flakes of roast coffee. The present coffee products exhibit increased extractability of the water-soluble contents, superior levels of aroma, and acceptable bed permeability so as to allow the expeditious provision of a flavorful coffee brew. The processes by which the present flaked coffees are prepared are also disclosed herein.

AGGREGATED MIXED-MOISTURE FLAKED COFFEE

In the provision of an aggregated mixed-moisture flaked coffee product having enhanced extractability, enhanced aroma, and acceptable bed permeability, it is essential to control the structure of the aggregated flaked particles, the flake thickness, flake moisture content, particle size distribution, bulk density, and aroma intensity. Each of these coffee product properties, as well as product preparation and product use, are described in detail as follows:

A. Structure

The mixed-moisture flaked coffee of the present invention comprises particles which are coffee flake aggregates. Such flake aggregates comprise a plurality of compressed coffee flakes bonded together. The terms "coffee flakes" or "flaked coffee" as used interchangeably herein refer to compressed roast and ground coffee particles which have length to thickness ratios exceeding about 2:1 and generally less than about 8:1. Such coffee flakes can be produced by roll milling roast and ground coffee.

When certain processing conditions are employed (as described in detail below) in the roll milling step, coffee flake aggregates are prepared. During roll milling, individual roast and ground paticles can enter the roll mill in sufficient proximity to one another such that when flattened by the compressive action of the roll milling operation, the edges of compressed coffee can overlap. The compressive force of the roll mill presses together the overlapping flake platelets and forms a particle wherein a plurality of flakes are bonded together. Due to the cohesive nature of the coffee, bonding of the flake platelets occurs simply as a result of the roll milling operation and without the presence of any adulterating binding agents.

Surprisingly, it has been discovered that certain flake aggregates have sufficient structural strength such as to provide acceptable bed permeability even though made from cold processed roast and ground coffee. To possess such structural strength, it is essential that each flake aggregate comprise at least one high-moisture coffee flake or "flake platelet" bonded to at least one low-moisture flake coffee. By "high-moisture" flake platelet as used herein, it is meant the coffee flake platelet which is prepared from a roast and ground coffee having a moisture content of from about 4.5% to 7% by weight. Similarly, a "low-moisture" flake platelet is prepared from "low moisture" roast and ground coffee having a moisture content of from about 1% to 3.5% by weight. Since each flake aggregate contains at least one high-moisture and one low-moisture flake platelet, the present flake aggregates are referred to herein as "mixed-moisture" flake aggregates.

Figure 1:
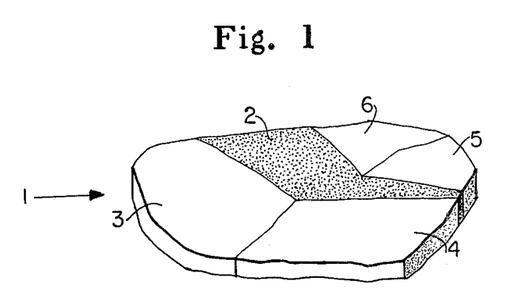
FIG. 1 is a perspective view of one embodiment of the present mixed-moisture flaked aggregates.

Referring now to the drawings, particularly to FIG. 1 thereof, there is shown a perspective view of one embodiment of the present mixed-moisture flaked aggregates. The flake aggregate 1 is comprised of a plurality of flake platelets 2, 3, 4, 5 and 6 of any shape bonded together. Each flake aggregate contains at least one low-moisture flake platelet 2. Each flake aggregate also contains at least one high-moisture flake platelet 3,4, 5 and 6.

Figure 2:
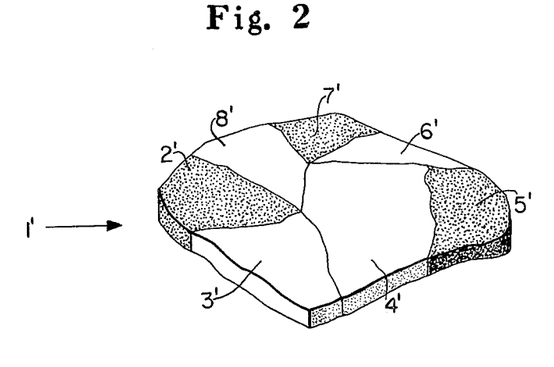
FIG. 2 is a perspective view of a second embodiment of the present mixed-moisture flaked aggregates.

Of course, the present coffee flake aggregates can contain more than one high- or one low-moisture flake platelet. Indeed, the larger coffee flake aggregates (e.g., flakes retained on a U.S. Standard 12 mesh screen) comprise a large number of each of low-moisture and high-moisture coffee flakes. Referring to FIG. 2, there is shown a perspective view of a second embodiment of the mixed-moisture flaked aggregates. The flake 1' is comprised of a plurality of flake platelets 2', 3', 4', 5', 6', 7' and 8'. Such a flake aggregate contains a plurality of low-moisture flake platelets 2', 5', and 7'. Also, each such flake aggregate contains a plurality of high-moisture flake platelets 3', 4', 6', and 8'.

Superior aggregated mixed-moisture coffee flakes are realized when the low-moisture flakes or flake platelets have a moisture content of from about 1.5% to 2.5% and the high moisture of flakes or flake platelets have a moisture content of from about 5.5% to 6.5%. Best results are achieved when the low-moisture flakes have a moisture content of 2% by weight and the high-moisture flake content is 6% by weight.

Flake Thickness

The improved flaked coffee products provided herein comprise coffee flake aggregates having a flake thickness ranging from about 9 mils to 16 mils (i.e., 0.009 inch to 0.016 inch). A superior coffee product has an average flake thickness within the range of from 10 to 14 mils. Best results are achieved when the flake thickness is about 12 mils. Such coffee flake aggregates provide improved extractability of the flavorful, water-soluble coffee constituents compared to thicker flaked coffee products disclosed by the prior art or commercially sold.

The greater extractability provided by the novel aggregated mixed-moisture flaked coffee product provided herein enables more cups of equal-brew strength and flavor to be brewed from a given amount of coffee. In comparison to an equal weight of conventionally processed coffee, it has been surprisingly found that the increase in titratable acidity for the aggregated flaked coffee product described herein is proportionately less than the increase in extractability. Therefore, not only could more cups of equal-brew strength be brewed from a given amount of thin-flaked coffee, but the equal-brew strength cups would also have lower acidity, which is often described by a consumer as less bitter.

The normal method of measuring the strength of a coffee brew is to measure the percent soluble solids, commonly referred to as brew solids. This measurement can be made by oven-drying the brewed coffee and weighing the remainder. The percent soluble solids can also be ascertained optically by measuring the index of refraction of the coffee brew. The index of refraction is correlated to brew solids as measured by the oven-drying technique.

Production of thinner flake aggregates requires, generally, more severe compression during the roll milling operation. The more severe compression adversely affects the aroma levels of flaked coffee. Thus, even for the more highly aromatic, cold-processed coffee of the present invention, thicker flaked coffee (e.g., 15 mils in thickness) will have an initial aroma level higher than thinner flaked coffee (e.g., 10 mils in thickness). However, thinner flaked coffee generally provides greater brew solids per unit weight. Particular balances of extractability and aroma level are thus a matter of choice.

Moisture Content

The aggregated flake coffee products disclosed herein have an average moisture content of from about 3% to 5% by weight of the coffee product. Preferred coffee products have an average moisture content of from about 3.5% to 4.5% by weight. For best results, the average moisture content of the present coffee products should be 4.2%. Of course, the average moisture content of the present coffee compositions is to be distinguished from the moisture content of individual flake platelets of which the present aggregated flake particles are comprised.

Low average moisture contents are to be avoided because, in general, the aggregated flakes are fragile. The fragile agglomerated flakes can break during process handling, packaging and shipping. Too large a percentage of broken flakes in turn changes the bulk density. If the density falls outside the range of from 0.395 g/cc to 0.485 g/cc, the product is unacceptable to the consumer. Moreover, even the present aggregated flake particles will exhibit poor bed permeability/drain time performance if the average moisture content is too low. On the other hand, excessively high moisture contents are to be avoided because the flakes can become tacky and oily in appearance. Additionally, high average moisture contents promote water extrusion during milling which can cause a substantial increase in the staling propensity of the resultant coffee product.

Typically, the average moisture content of the present aggregated flake coffee products is controlled by varying the moisture levels of the high moisture flakes and the low moisture flakes within the above-specified ranges for these flake components as well as the respective weight fractions of the low- and high-moisture flakes.

The component flake or flake platelet moisture contents are adjusted by varying the moisture levels of the whole roast beans and thereby the roast and ground coffee feeds from which the flakes are produced. The adjustments to the feed moisture level can be controlled, for example, by controlling the amount of water used to quench and thereby to halt the exothermic roasting operation, and, thereafter, allowing the coffee beans to come to moisture equilibrium prior to grinding. Neither the grinding nor the flaking operations appreciably affect the moisture content of the coffee.

Particle Size Distribution

As noted above, the aggregated flaked coffee provided herein has a flake thickness within a select, particular thickness range. It is also important to control the dimension which characterizes the particle size of the coffee flakes in order to control bed draining performance.

It is conventional in the coffee art to describe coffee particle size distribution—including flaked coffee—in terms of sieve fractions, i.e., that weight percentage which remains on a particular sieve or that weight percentage which passes through a particular sieve. For example, a hypothetical coffee product might have a sieve analysis such that 40% by weight remains on a U.S. Standard No. 14 sieve with 60% by weight passing through a No. 14 sieve. Since the sieve opening for a No. 14 sieve is approximately 55 mils, such a coffee product would comprise about 40% by weight of particles which have a particle size greater than 55 mils, while the remaining weight fraction would comprise particles which have a particle size less than the 55 mil-size opening.

Many coffee users have their standards based on using "Tyler" standard screen scale testing sieves. The only difference between U.S. Standard sieves and the Tyler screen scale sieves is the identification method. Tyler screen scale sieves are identified by the nominal meshes per liner inch while the U.S. Standard sieves are identified by millimeters or microns or by an arbitrary number which does not necessarily mean mesh count.

Generally, an acceptable aggregated flaked coffee product can be made whose sieve analysis corresponds to those particle size distributions commonly referred to as "regular", "drip" and "fine" (defined below). Preferred flaked coffee compositions have a particle size distribution such that:

| Sieve (U.S. Standard) | Wt. % |
| --- | --- |
| Remains on No. 12 | 0–12 |
| Through No. 12 but remains on No. 16 | 2–28 |
| Through No. 16 but remains on No. 20 | 10–30 |
| Through No. 20 but remains on No. 30 | 10–25 |
| Passes through No. 30 | 30–60 |

Maintenance of the particle size distribution of the present aggregated coffee products within the above given ranges provides both improved extractability as well as acceptable bed draining performance.

Bulk Density

The aggregated flaked coffee product of the present invention should have a bulk density of from about 0.395 g./cc. to 0.485 g./cc. in order to assure its consumer acceptability. Bulk densities within this range are desirable since conventionally prepared roast and ground coffees of "regular", "drip", and "fine" grinds have bulk densities within this range. Fortunately, the present invention provides flakes of high structural integrity. The desirability of flakes of high structural integrity (i.e., physical strength and resistance to attrition or breakage during packaging) is important because large percentages of broken flakes occasioned by transportation can markedly change the bulk density as well as present an unappealing appearance, produce settlement after packaging, and cause cup sediment in the brew.

Initial Aroma Concentration

The present flaked coffee product has an initial aroma concentration as measured by the method described below of at least about 20,000 gas chromatograph total counts. Better flaked coffee products of the present invention have at least about 25,000 gas chromatograph total counts. For best results, the present fixed coffee products should have an initial aroma concentration of at least about 30,000 gas chromatograph total counts.

As used herein, "aroma" refers to those aromatic volatile materials which are present in the headspace or void space in contained or packaged coffee. Thus, "aroma" as used herein is to be distinguished from the coffee aroma resulting from brewing, and from the coffee aroma detectable above a freshly prepared coffee brew. The term "initial aroma" is intended to refer to the aroma level of the present flaked coffee products at equilibrium in a sealed container prior to opening. It is, of course, realized that any coffee product if allowed to remain exposed to open air will eventually lose its aroma due to the volatile and fugitive nature of coffee aroma materials.

High initial aroma concentrations of coffee aroma, of course, provide the desirable "fresh coffee" aroma impression to the coffee user upon opening the coffee container. Further, the high initial aroma concentrations of the present invention have some beneficial effect upon the organoleptic properties of coffee brews made from the present coffee products.

The high initial aroma concentrations of the present development are achieved by minimizing the aroma losses of the roast coffee in the grinding, mixing and flaking steps of the present process of preparation. While it is hypothetically possible to achieve similar initial aroma levels by the addition of a highly aromatized oleaginous carrier oil, the addition of such adulterating substances is not contemplated herein. The addition of such materials would undesirably increase the oil level in the present coffee products above the natural oil level of the coffee.

Starting Material Selection

The aggregated, mixed-moisture flaked coffee provided herein can be made from a variety of roast and ground coffee blends, including those which may be classified for convenience and simplification as low-grade, intermediate grade, and high-grade coffees. Suitable examples of low-grade coffees include the natural Robustas such as the Ivory Coast Robustas and Angola Robustas; and the Natural Arabicas such as the natural Perus and natural Ecuadors. Suitable intermediate-grade coffees include the natural Arabicas from Brazil such as Santos, Paranas and Minas; and natural Arabicas such as Ethiopians. Examples of high-grade coffees include the washed Arabicas such as Mexicans, Costa Ricans, Colombians, Kenyas and New Guineas. Other examples and blends thereof are known in the art and illustrated in, for example, U.S. Pat. No. 3,615,667 (issued Oct. 26, 1971 to Joffe), incorporated herein by reference.

Decaffeinated roast and ground coffee can also be used herein to make a decaffeinated thin-flaked coffee product. As is known in the art, the removal of caffeine from coffee products frequency is accomplished at the expense of the removal of certain other desirable components which contribute to flavor. The tendency of decaffeinated products to be either weak or deficient in flavor has, thus, been reported in the literature. The provision of thin-flaked cofffee made from decaffeinated roast and ground coffee by the novel thin-flaking method of the present invention provides a compensatory advantage. The added flavor and strength advantages achievable by enhanced extractability permits realization of levels of flavor and brew strength which might otherwise not be attainable in the case of a conventional decaffeinated roast and ground product.

Typically, decaffeination of coffee is accomplished by solvent extraction prior to the roasting of green coffee beans. Such decaffeination methods are well known in the art and illustrated in, for example, U.S. Pat. Nos. 3,671,263 (issued June 20, 1972 to Patel); 3,700,464 (issued Oct. 24, 1972 to Patel); 3,700,465 (issued Oct. 24, 1972 to Lawrence); and 3,671,262 (issued June 20, 1972 to Wolfson). See also "Coffee Processing Technology", by Sivetz & Foote, The Avi Publishing Co., Westport, Conn., 1963, Vol. II, pp. 207 to 278. Each of these references are incorporated herein by reference.

PREPARATION OF AGGREGATED FLAKED COFFEE

The aggregated, mixed-moisture flaked coffee of the present invention can be formed by mixing together a low-moisture stream and a high-moisture stream of conventional roast and ground coffee, each of which has been cold processed, and then subjecting the coffee to the compressive pressures of a roll mill operating under particular roll milling conditions, Thereafter, the aggregated flaked coffee so produced is sized by suitable means to achieve the requisite particle size distribution of the present aggregated flake coffee compositions.

A. Cold Grinding

Two coffee bean fractions are independently ground in the process of the present invention. A first coffee fraction is a low-moisture fraction and comprises coffee beans having a moisture content of from about 1% to 3.5% by weight of the low-moisture beans. The second bean fraction is a high-moisture fraction and comprises coffee beans having a moisture content of from about 4.5% to 7.0% by weight of the high-moisture beans. Each coffee fraction is ground separately but in a similar manner.

It is essential in the process of preparing the present flaked coffee product that each coffee fraction be cold ground. By "cold grinding" or "cold comminuting" herein, it is meant that the ground coffee exit the coffee grinder at a ground coffee temperature below 40° F., preferably from about 20° F. to 40° F.

A variety of cold grinding methods are known and may be used herein. Two common "cold grinding" processes are (1) cooling the whole roast coffee to a temperature of −5° F. to 5° F. before grinding, and (2) mixing the whole roast coffee with solid carbon dioxide, dry ice, just prior to grinding.

The grinding of the coffee beans mixed with solid carbon dioxide or the like is described in detail in U.S. Pat. No. 1,924,059 (issued Aug. 22, 1933 to W. Hoskins). The dry ice, for example, is mixed with coffee beans in a weight ratio of coffee to dry ice of about 6 to 9 lbs. to 1 lb. The dry ice should have a particle size of less than about ¼ in. diameter. Thereafter, the dry ice/coffee bean mixture is comminuted in a conventional manner to form a roast and ground coffee. However, any cold grinding method can be utilized which maintains the coffee during grinding at a temperature below 40° F., preferably below 35° F.

Depending upon the specific particle size distribution desired in the final product of the present invention, the coffee fractions can be ground to the particle size distributions or "grind sizes" traditionally referred to as "regular", "drip", or "fine" grinds. The standards of these grinds as suggested in the 1948 Simplified Practice Recommendation by the U.S. Department of Commerce (see Coffee Brewing Workshop Manual, page 33, published by the Coffee Brewing Center of the Pan American Bureau) are as follows:

|  | Sieve (Tyler) | Wt. % |
| --- | --- | --- |
| "Regular grind": | | |
|  | on 14-mesh | 33% |
|  | on 28-mesh | 55% |
|  | through 38-mesh | 12% |
| "Drip grind": | | |
|  | on 28-mesh | 73% |
|  | through 28-mesh | 27% |
| "Fine grind": | | |
|  | through 14-mesh | 100% |
|  | on 28-mesh | 70% |
|  | through 28-mesh | 30% |

Typical grinding equipment and methods for grinding roasted coffee beans are described, for example, in Sivetz & Foote, "Coffee Processing Technology", Avi Publishing Company, Westport, Conn., 1963, Vol. 1, pp. 239–250.

B. Blending

The high-moisture roast and ground coffee fraction is blended with the low-moisture roast and ground coffee fraction to form a mixed-moisture roast and ground feed for the roll-milling operation. Any suitable method of admixing the coffee fractions which does not involve high shear mixing can be employed. High shear mixing is unsuitable because shear mixers work the roast and ground coffee causing increased particle size reduction.

Especially desirable and suitable mixing devices are revolving "horizontal plane baffle" mixers such as a common cement mixer; however, the most preferred blenders are falling chute riffle blenders. A falling chute riffle blender is comprised of a large cylindrical tube-like vessel with downwardly mounted baffles on the inside walls thereof. To promote gentle tumbling and intermixing, the high-moisture roast and ground coffee particles and the low-moisture roast and ground coffee particles to be admixed are gravity fed through the baffled vessel.

It is important to the operation of the method that the roast and ground coffee fractions during the blending step be maintained at a temperature of below 40° F. Better results are achieved when coffee fractions during blending are maintained at a temperature of 35° to 40° F. Best results are obtained when the coffee fractions' temperature is between about 35° F. and 40° F. during blending. This cold blending minimizes aroma material losses and thus aids the realization of the initial aroma levels exhibited by the aggregated flaked coffee products of the present invention.

C. Roll Milling

In the step of roll milling the mixed moisture roast and ground coffee to produce the present aggregated flaked coffee, it has been found important to control several processing variables: (1) coffee feed temperature, (2) roll surface temperature, (3) roll diameters, (4) static gap, (5) the roast and ground coffee feed moisture content, (6) feed rate, (7) roll peripheral surface speed, (8) roll pressure, (9) the mill feed particle size distribution, and (10) density of mill feed.

The process of the present invention can be practiced with the aid of any of a variety of roll mills of various roll diameters capable of subjecting roast and ground coffee to mechanical compressing action and adapted to the adjustment of roll pressure, roll speed and roll temperature. Suitable mills are those having two parallel rolls such that coffee particles passed between the rolls are crushed or flattened into flakes. Normally, smooth or highly polished rolls will be employed as they permit ready cleaning; other rolls can, however, be employed if the desired flaking effects can be obtained.

1. Coffee Feed Temperature

The temperature of the mixed moisture roll mill roast and coffee when fed into the roll mill should be about 35° F. to 40° F. Maintenance of the coffee feed temperature along with maintenance of the roll surface temperature within the ranges given below insures that aroma losses during the roll milling step are sufficiently reduced such that the resultant flaked coffee has an aroma level sufficient to provide the desired initial aroma layer for flakes of all thicknesses.

2. Roll Surface Temperature

Control of the surface temperature of each roll has been found to be important to the provision of flaked roast and ground coffee of high extractability. Roll surface temperature, as used herein, is measured in degrees Fahrenheit and refers to the average surface temperature of each roll of the roll mill. The rolls can be operated at differential operating temperatures. However, operation under conditions of differential roll temperatures is not preferred. Best results are obtained when each roll is operated at the same temperature.

The surface temperature of each of the respective rolls can be controlled in known manner. This is usually accomplished by control of the temperature of a heat exchange fluid passing through the inner core of the rolls.

To produce the aggregated, mixed moisture flaked roast and ground coffee of the present invention, it is essential that the roll surface temperature be within the range of from 50° F. to 80° F., preferably between about 60° F. to 70° F. In general, higher roll surface temperatures produce flakes of roast and ground coffee and which typically have undesirably low levels of aroma. Lower roll surface temperatures require elaborate cooling systems and therefore higher costs.

3. Roll Diameters

The diameter of the roll mills controls the angle of entry into the nip which in turn affects flake thickness and bulk density. Rolls smaller than 6 inches in diameter can be employed to flake coffee; however, such small rolls tend to hamper passage of the coffee through the mill by a churning effect which decreases throughput and efficiency. Roll mills with diameters of up to 48 inches are suitable for use herein. However, best results are obtained from mills having diameters in the range of from 6 to 30 inches. Examples of suitable mills which can be adapted in known manner to operate within the parameters defined hereinbefore include any of the well-known and commercially available roll mills such as those sold under the tradenames of Lehmann, Thropp, Ross, Farrell and Lauhoff.

4. Static Gap

As used herein, the term "mechanical static gap" represents that distance separating the two roll mills along the line of nip while at rest and is typically measured in mils. A special condition of roll spacing is "zero static gap" which is used herein to indicate that the two rolls are in actual contact with each other along the line of nip when the roll mills are at rest. As roast and ground coffee is fed into the roll mills and drawn through the nip, it causes the rolls to deflect an amount which is dependent upon the roll peripheral speed, roll pressure, and coffee feed rate. Accordingly, the aggregated mixed-moisture flaked coffee of the present invention can be made even when the roll mills are set at zero static gap. Because of the deflecting action of the coffee feed as it passes through the roll mill, the static gap setting must be less than the desired flake thickness. Suitable static gap settings range from 0 (i.e., from a zero gap setting) up to about 1 mil, 0.001 in.

In the most preferred method of practice, a zero static gap spacing of the roll mills is employed. Differential roll peripheral surface speeds are to be strictly avoided when the roll mills are set for zero static gap operation. Contact along the line of nip between rolls operating at differential peripheral surface speeds can cause several physical damage to the roll mill. Differential roll peripheral surface speeds can be utilized, however, with static gap spacings exceeding about 1 mil.

5. Moisture Content of the Roll Mill Feed

As indicated above, in producing consumer-acceptable aggregated flaked roast coffee, it is essential that the average aggregated flaked moisture content be from about 3% to 5% by weight. Since the moisture level of the coffee particles is not significantly affected by the flaking operation, the moisture level of the aggregated flaked coffee product herein can be controlled by controlling the moisture content of the roast and ground coffee feed.

6. Feed Rate

The feed rate into the roll mill is to be distinguished from the throughput rate of the roll mill. The feed rate to the roll mill is that amount of material per hour per inch of nip which is fed into the nip area. The throughput rate is the amount of material per hour per inch of nip that actually passes through the roll mill. When the feed rate exceeds the throughput rate, a condition occurs which is referred to in the art as "choke feeding". When choke feeding occurs, there is a buildup of material which "boils" in the nip region before passing through the nip. Such boiling may cause an undesirable effect on the particle size distribution of the flaked coffee product by increasing the percentage of fines and, therefore, is to be avoided.

Conversely, when the feed rate falls below the theoretical throughput rate, the feed rate and throughput rate are the same. This condition is referred to in the art as "starve feeding". Starve feeding offers the particular process advantages as increased equipment life and increased process flexibility and is, therefore, the suitable mode of operation in the method of the present invention.

7. Roll Peripheral Surface Speed

Control of the peripheral surface speeds of the rolls has also been found to be important to the provision of the present aggregated flaked coffee. The roll peripheral surface speed is measured in feet per minute of roll surface circumference which passes by the nip. Generally, the roll mill should be operated at a roll speed of from about 470 ft./min. to 1880 ft./min., preferably from about 1180 ft./min. to 1650 ft./min.

For a given set of roll mill operating conditions, the throughput rate, the roll peripheral surface speed and the thickness of the flaked coffee produced are closely related. In the production of flaked coffee of a specified thickness, the throughput rate is directly related to the roll peripheral surface speed. Thus, an increase in the roll peripheral surface speed allows an increase in the throughput rate in producing flakes of specified thickness. When a constant throughput rate is maintained (e.g., by controlling the feed rate), higher roll peripheral surface speeds produce thinner flakes and conversely, lower roll peripheral surface speeds produce thicker flakes.

As the roll peripheral surface speeds increase to greater than about 1700 ft./min., the production of undesirably high levels of fines begins to occur. Moreover, high peripheral surface speeds promote temperature increases which can alter and degrade the flavor of the roast and ground flakes produced.

While peripheral surface roll speeds have been set forth in connection with operation of a roll mill to provide flaked coffee of improved extractability, it will be appreciated that optimal speeds will be determined in part by the other roll mill conditions such as the size of the rolls employed, the static gap setting, etc., as well as the physical and organoleptic properties desired in the flaked product.

8. Roll Pressure

Roll pressure will also influence the nature of the aggregated, mixed-moisture coffee flakes obtained by the process of the present invention. Roll pressure is measured in pounds per inch of nip. Nip is a term used in the art to define the length of surface contact between two rolls when the rolls are at rest. To illustrate, it can be thought of as a line extending the full length of two cylindrical rolls and defining the point or line of contact between two rolls.

To produce the present coffee flake aggregates in high yield, roll pressures should be within the range of from 150 lbs./linear in. of nip to 4,000 lbs./linear in. of nip and preferably within the range of from 1,000 lbs./linear in. of nip to 2,000 lbs./linear inch of nip. In general, operable feed rates are directly related to the roll pressure. Thus, higher roll pressure allows a higher feed rate to the roll mill to produce a flake of specific thickness for otherwise equivalent operating conditions of the roll. Roll pressure can also be used to fine tune finished product density, e.g., lower roll pressure results in slightly lower density. The disadvantages of using higher roll pressures are primarily mechanical, e.g., more expensive equipment is needed to produce higher roll pressures. Conversely, at low roll pressures, the feed rate can drop below commercially desirable rates.

9. Mill Feed Particle Size Distribution

The particle size distribution of the roll mill feed mixture of high and low moisture roast and ground coffees has an effect on the particle size distribution of the aggregated flaked coffee product of the present invention. A coarse mill feed particle size distribution causes the final flaked product to have a coarser particle size distribution than if the mill feed particle size distribution had been finer. Therefore, depending upon the specific particle size distribution desired in the final product, the coffee can be "ground" to meet the specifications. The ranges that are used for mill feed particle size distribution in this invention are:

| Sieve Size (U.S. Standard) | Weight % of the Composition |
|---|---|
| remains on 12 | 0–80 |
| through 12, remains on 16 | 0–40 |
| through 16, remains on 20 | 0–45 |
| through 20, remains on 30 | 0–55 |
| through 30 | 0–40 |

10. Mill Feed Density

The density of the roll mill feed mixture of high and low moisture roast and ground coffees has an effect on the density of the final aggregated flaked coffee product. The density of the flaked product will be higher when the mill feed density is high than if the mill feed density had been low. The mill feed density is controlled in two ways: by the whole roast density and by the mill feed particle size distribution. The whole roast density can vary from 0.370 gm/cc to 0.415 gm/cc. Since the density of the coffee increases throughout the maufacturing process, the whole roast density sets the lower limit of the density. Secondly, the coarser the mill feed particle size distribution, the less dense the mill feed will be. The mill feed density can vary from 0.375 gm/cc to 0.475 gm/cc.

D. Screening

After the roast and ground coffee feed has been flaked by being passed through the roll mill, it is essential that the aggregated, mixed-moisture flaked coffee produced goes through a sizing operation to insure a particle size distribution as described above. Impurities in the roast and ground coffee feed to the roll mill typically produce oversized flakes which can be readily removed by the sizing operation. And too, since operation of the roll mill within the parameter ranges given above can result in a secondary grinder effect, the sizing operation serves to remove an undesirable level of fine particles.

A wide variety of suitable sizing methods and apparatus are known in the art (see for example, "Perry's Handbook for Chemical Engineers", McGraw-Hill Book Co., pp. 21–46 to 21–52, incorporated herein by reference). For example, the aggregated, mixed-moisture flaked coffee can be effectively screen-sized by dropping the flaked coffee particles from a hopper, chute or other feeding device into a mechanically vibrating screen or into a multiple sieve shaker such as those marketed by Newark Wire Cloth Company and the W. S. Tyler Company. Typically, the sizing operation separates the flaked coffee of various particle sizes into desired size fractions in less than one minute.

The aggregated, mixed mixture flaked roast and ground coffee of the present invention can be packaged and utilized in the preparation of a coffee brew or extract in known manner. When the aggregated flakes are produced by the milling process herein described, a content of fines will normally be present even after the sizing operation, and depending upon the particular extraction method employed, a greater or lesser amount of cup sediment may be observed.

The aggregated coffee flakes can be blended with roast and ground coffee which has not been milled. It may also be blended with roasted grains such as sprouted barley, rye, chicory among others. This mixture can be brewed to produce a coffee-like beverage. The amount of grain used can be from 10% to about 60% of the total blend.

BEST MODES OF CARRYING OUT THE INVENTION

The following Examples are offered to further illustrate but not limit the invention disclosed herein.

EXAMPLE I

Seventy-five pounds of a blend comprising 30% high quality Arabicas, 30% Brazils and 40% Robustas is roasted in two approximately equal fractions in a Jubilee roaster to end point temperatures within the range of from about 450° F. to 500° F. in about 12 minutes total roast time. The two separately roasted fractions are quenched with 0.5 gallons of water and 1.0 gallons of water, respectively, and are characterized by a roast color of 75 photovolts. After equilibrating for 3 hours at 70° F. in separate storage bins, each fraction is cooled to a temperature 0° F. Thereafter, each fraction is separately ground slightly finer than a regular grind size in a Gump pilot grinder. Upon exiting the grinder, the fractions are at a temperature of 35° F. A sample of each fraction of the roast and ground coffee is taken for analysis. A sieve screen analysis of the first fraction indicates a particle distribution as follows:

| Sieve (U.S. Standard) | Wt. % |
|---|---|
| On No. 12 | 5% |
| Through No. 12 on No. 16 | 32% |
| Through No. 16 on No. 20 | 38% |
| Through No. 20 on No. 30 | 14% |
| Through No. 30 on Pan | 12% |

The moisture level of the first roast and ground coffee fraction is about 2.5% by weight and is therefore a "low-moisture" roast and ground coffee fraction. The second fraction has a similar particle size distribution and has a moisture level of about 5.5% by weight and is therefore a "high-moisture" roast and ground coffee fraction.

Both the low-moisture and the high-moisture roast and ground coffee fractions are halved into two portions. One-half of each fraction is used for a control production of non-mixed moisture flaked coffee, while the remaining half is utilized for the production of aggregated mixed moisture flaked coffee in the following manner:

A 19 pound portion of low-moisture roast and ground coffee is mixed with a 19 pound portion of high-moisture roast and ground coffee by simultaneously feeding it into a falling chute riffle blender at a feed rate of 500 lbs/hr. The temperature of the two fractions is 35° F. when entering the riffle blender. Upon exiting the riffle blender the mixture of high-moisture and low-moisture roast and ground coffee is at the temperature of 38° F. Thereafter, the roast and ground mixed moisture feed is starve-fed by dropping a cascade of the particles into the rolls of a Ross 2-roll mill which is set at a zero static gap, each roll being of 18 inch in diameter. The feed rate is 110 lbs./hr./in. of nip. The roll pressure is adjusted to provide a pressure of 1000 lbs./linear inch of nip. Each roll is operated at a peripheral surface speed of 1414 ft./min. and at an average roll surface temperature of 70° F. The aggregated mixed-moisture flaked coffee particles dropping from between the rolls are gravity fed into a 6 mesh Sweco screen and are screened for 30 seconds.

Fifty-five percent by weight pass through a 30 mesh U.S. Standard Sieve. The sieve-screened product has a bulk density of 0.445 g/cc, and an average moisture level of 4.2% by weight.

Ten representative flakes from the No. 16 sieve are selected for flake thickness measurement. Each is measured using a Starrett Model 1010 gauge manufactured by L. S. Starrett Company. The ten flake thickness measurements are averaged and are reported to the nearest whole number. The aggregated mixed-moisture flaked coffee product is characterized by an average flake thickness of 10 mils.

The aggregated mixed-moisture coffee product prepared in the above-described manner exhibits increased extractability of the water-soluble constituents and increased initial aroma level over the control product and exhibits acceptable drain time performance of 3.5 minutes.

Flaked coffee compositions of substantially similar physical and organoleptic character are realized when a low-moisture roast and ground fraction having an average moisture content of 2.0% by weight and a high-moisture roast and ground coffee fraction having an average moisture content of 6.0% by weight is used in Example I.

EXAMPLE II

Two batches of approximately 150 pounds each of regular green beans of a similar blend to that in Example I are roasted in a Thermalo roaster. The roasted coffee batches are water-quenched with 2.0 gallon and 4.0 gallons of water, respectively. Thereafter, the two coffee bean fractions are equilibrated for 3 hrs. at 70° F. The integrity of the respective moisture contents is maintained through separated coffee storage bins.

The first regular coffee bean fraction (2.0% moisture) is separately ground in Gump grinder along with 20 lbs. of dry ice having an average particle size of ¼ in. to form a "coarse" grind sized low-moisture ground coffee stream. Upon exiting the grinder, the coffee's temperature is 34° F. The second green bean fraction comprising 130 lbs. of roasted coffee beans (6.0% moisture) is simultaneously fed to the Gump grinder along with 20 lbs. of dry ice having an average particle size diameter of ¼ inch to form a "fine" grind sized stream with particle size distributions as follows:

| Sieve (U.S. Standard) | Coarse | Fine |
|---|---|---|
| On No. 12 | 30% | 0% |
| Through No. 12, remains on No. 16 | 43% | 6% |
| Through No. 16, remains on No. 20 | 15% | 32% |
| Through No. 20, remains on No. 30 | 6% | 40% |
| Pan | 6% | 22% |

The exit temperature of the high-moisture coffee from the grinder is 36° F. The two streams are added simultaneously to a common cement rotary mixer which is maintained at a room temperature and are mixed for one minute to achieve substantial uniform admixing. The well-mixed coffee temperature is 38° F.

Thereafter, the mixed moisture stream of regular roast and ground coffee is passed through a 2-roll mill, as in Example I, except the feed rate is about 50 lbs./hr./in. and the roll peripheral surface speed is 1650 ft./min.

The aggregated mixed-moisture flaked coffee particles dropping from between the rolls are passed through a 6-mesh screen (U.S. Standard) to provide a product having a particle size distribution as follows:

| Sieve (U.S. Standard) | Weight |
|---|---|
| On No. 12 | 2% |
| Through No. 12, remains on No. 16 | 12% |
| Through No. 16, remains on No. 20 | 19% |
| Through No. 20, remains on No. 30 | 28% |
| Pan | 39% |

The flaked coffee has an average flake thickness of 12 mils. The product has a bulk density of about 0.45 g./cc. The product is brewed in a Norelco automatic drip coffee maker using 5.35 grams of flaked coffee for each 6 ounces of water and produces a coffee brew in 3 minutes and 30 seconds with 0.97% solids as determined by refractive index measurement. Thus, efficient extraction and rapid drainage are achieved.

Flaked coffee compositions of substantially similar physical and organoleptic character are realized when in the process of Example II, the flake thickness of the coffee flake aggregates is 12 mils.

EXAMPLE III

Two hundred and ten pounds per minute of a coffee bean blend comprising 50% high quality Arabicas, 30% Brazils, and 20% Robustas are roasted in a Jabez-Burns 21-R continuous roaster at 12 RPM. The roasting temperature is 445° F., the residence time in the roaster is 3.17 minutes and the flight loading is 17.5 pounds. The roasted beans are quenched to a 2.5% moisture level with 2.4 gallons/min. of water. The color of the roast is 79 photovolts. A second stream of coffee of a similar blend is roasted at the same rate and in a similar manner with the exception of quenching to a 5.5% moisture level with 4.9 gallons/min. of water. After equilibrating for 48 hours at 0° F. in separate storage bins, each fraction is ground very coarse in a Gump grinder. A sample of each fraction of the roast and ground coffee is taken for analysis. The particle size distribution analysis of the fraction show:

| U.S. Standard Sieve | Wt. % |
|---|---|
| Remains on No. 12 mesh | 75% |
| Remains on No. 16 mesh | 10% |
| Remains on No. 20 mesh | 8% |
| Remains on No. 30 mesh | 4% |
| Passes through No. 30 mesh | 3% |

One hundred pounds of each of the high and of the low-moisture coffees are simultaneously fed into a falling chute riffle blender. The mixture is about 35° F. when entering the riffle blender. Upon exiting the blender, the high moisture and low moisture mixture is about 38° F. Thereafter, the roast and ground mixed-moisture feed is starve-fed by dropping a cascade of particles into the rolls of a Ross 2-roll mill of dimensions stated in Example I. The feed rate is 100 lbs./hr./in. while the roll pressure is adjusted to provide 225 lbs./linear inch of nip. The aggregated mixed moisture flaked coffee particles dropping from between the rolls are gravity fed into a Sweco screening device and were screened for 10 seconds. The resultant sieve analysis is:

| Sieve Size, U.S. Standard Sieve | Wt. % |
|---|---|
| Remains on No. 12 | 6% |
| Remains on No. 16 | 18% |
| Remains on No. 20 | 23% |
| Remains on No. 30 | 22% |
| Passes through No. 30 | 31% |

The sieve-screened product has a bulk density of 0.405 gm./cc. and an average moisture level of 4.0% by weight. The aggregated mixed-moisture flaked coffee product is characterized by an average flake thickness of 0.016 inch.

The aggregated mixed-moisture coffee product prepared in the above-described manner exhibits increased extractability of the water-soluble constituent, and acceptable drain time performance. The initial aroma level of this product is about 45,000 GC counts.

Testing and Evaluation

Initial Aroma Level

The present aggregated flaked coffee compositions provide superior levels of coffee aroma in the headspace or voidspace of canisters holding the vacuum packed coffee. Superior coffee aroma levels thus provide an enhancement of the pleasurable "fresh ground" coffee aroma upon the opening of the packed coffee. The superiority of the initial coffee aroma levels of the present flaked coffee compositions can be confirmed and quantified by resort to comparisons of the volatile materials concentration in the voidspace.

A suitable technique for measuring the initial coffee aroma of the flaked coffee aggregates produced by the process of the invention is gas chromatography. The flame ionization gas chromatograph analytical measurement herein measures the total content of organic compounds in a gas headspace or void-space sample from packaged coffee on a scale of relative intensity. The scale is granulated in microvolt-seconds (referred to herein as "counts") which is a measure of the area under the intensity curve, and the result is reported as an integration of the total area under the curve in total microvolt-seconds ("total counts").

A. PRINCIPLE OF OPERATION

The chromatograph comprises a 36 inch chromosorb WAW (acid washed) 60/80 mesh column of ¼ in. diameter and is housed in an oven section for isothermal temperature control. The column is packed with a uniform sized solid called the solid support but is not coated with a non-volatile liquid (called the substrate) because the gas is not to be separated into individual compounds as is commonly done in this type of analysis. A hydrogen flame detector is used at the outlet port. An electrometer receives the output signal from the flame detector and amplifies it into a working input signal for an integration. The integrator both sends a display signal to a recorder to print out the response curve and electronically integrates the area under the curve.

The gas sample is injected into a heated injection port, and is immediately swept into the packed column by a carrier gas flow. The non-separated gas mixture is swept as a compact band through the column and into the detector. The detector then ionizes the sample and generates an electrical signal proportional to the concentration of the materials in the carrier gas. The ionized gases and carrier gas are then vented from the unit.

B. SPECIFIC EQUIPMENT AND CONDITIONS

A Hewlett Packard gas chromatograph (Model 700), electrometer (Model 5771A), integrator (Model 3370A), and recorder (Model 7127D), range 0–5 mv. and temperature controller (Model 220) were used. Nitrogen pressure in the column is approximately 16 psig. Air pressure of 24 psig is used to flush out the detector. An oven temperature of 100° C. is used and maintained to keep the volatiles vaporized. The hydrogen is supplied from a gas cylinder regulated at 30 lbs. psig.

C. ANALYTICAL PROCEDURE

Each peak is measured in counts, the counts being first measured by the flame detector and then both integrated and recorded. The number of counts for a particular component is directly proportional to the number of milligrams of that components in the vapor sample.

The recorder was synchronized with the integrator as follows:

1. Calibration

A standard methane gas is used to precisely set the flame ionization response. Prior to analyzing the samples, a 1 cc. sample of gas is obtained from a gas cylinder (0.5% by weight of $CH_4$). The gas sample is at a pressure of 4.0 psig. The gas sample is syringed into the inlet port of gas chromatograph. The attenuation of the recorder is set at 8 while the range is 10. The total counts when the procedure is repeated three times average between 145,000 to 150,000 total counts. If the average is not within the specified range, the air flow rate is adjusted.

2. Sample Analysis

The sample must be vacuum packed for at least 3 days at 75°±5° F. before sampling. The container is placed in an airtight box supplied with a source of inert gas such as $N_2$. The vacuum-sealed canister of coffee is punctured to remove the vacuum, then resealed and allowed to equilibrate at least one hour at 75°±5° F. to allow aroma phase equilibration.

After equilibration, a 1 cc. sample of the aromatic atmosphere of the canister headspace/voidspace is taken again using the same type of syringe as used for the standard methane sample. The gas sample is then injected into the inlet port of the gas chromatograph.

TABLE I

| | Composition | Initial Aroma Level Total G.C. Counts |
|---|---|---|
| 1. | Retail Flaked Coffee | 16,000 |
| 2. | Institutional Flaked Coffee | 16,000 |
| 3. | Example I | 20,000 |
| 4. | Example II | 30,000 |
| 5. | Example III | 45,000 |

Superior initial aroma levels are demonstrated, for purposes of the present invention, by a gas chromatograph total count of about 20,000 or above. Thus, it can be seen from the above Table that representative aggregated, mixed-moisture flaked coffee compositions of the present invention possess superior initial aroma levels inasmuch as their respective aroma levels all exceed 20,000 total counts. The commercially available institutional and retail flaked coffees fail to exhibit such superior initial aroma levels. As a result of the superiority of the initial aroma levels the compositions of the present invention provide surprisingly greater levels of the pleasant "fresh ground" coffee aroma. Also, the present flaked coffee compositions provide coffee brews of superior taste.

Bed Permeability/Drain Time

The present aggregated flaked coffee compositions exhibit high bed permeabilities. High bed permeabilities enable the expeditious provision of coffee brew as measured by drain time. The term "drain time" as used herein has its art recognized meaning and refers to that time starting when the water delivery to the coffee bed ceases and stopping when the water level drops completely below the surface of the coffee particles at the top of the wet coffee bed.

Specific Equipment and Operating Conditions

A Norelco-12 Automatic Drip Coffeemaker ("ADC") Model No. 5135 is used for the drain time measurement herein. This device is consistent from cycle to cycle in water delivery rate and water temperature (180° F.). Moreover, the bed height in the Norelco-12 unit is higher than in most other commercial brewing devices so the testing is more rigorous. The Norelco-12 ADC consists of a water delivery unit with water reservoir and hot plate, a glass coffee carafe, and a coffee basket with lid. Paper filters (3½ in. disc type) are used in the bottom of the basket to prevent the grounds from falling into the coffee pot. An analytical balance is used for weighing the coffee sample. A 2000 ml. graduated cylinder is used for measuring the distilled water. A stop clock is used for measuring the drain time.

Analytical Procedure

The water reservoir is filled with 1420 ml of distilled water. The coffee basket with filter is filled with 44.8 gm. of coffee.

The water reservoir is filled with 1420 ml of distilled water. The coffee basket with filter is filled with 44.8 gm. of coffee. The measurement of the drain time begins at the point the water delivery stops and is considered complete when there is no longer any water on top of the coffee bed.

Analysis of several samples of the above products according to the described technique are given in Table II as follows:

TABLE II

| | Composition | Drain Time Value Drain Time (Minutes) |
|---|---|---|
| 1. | Retail flaked coffee | 2:00 |
| 2. | Institutional flaked coffee | 2:30 |
| 3. | Example I | 3:30 |
| 4. | Example II | 3:30 |
| 5. | Example III | 2:30 |
| 6. | Control Example I - 3% moisture flakes | 9:00 |
| 7. | Control Example I - 4% moisture flakes | 7:00 |

Drain times in excess of 5 minutes are commercially unacceptable. Thus, it can be seen from the above Table II that representative, mixed-moisture flaked coffee compositions of the present invention have commercially acceptable drain times, even though they have been cold processed. In contrast, the control products of Examples I and II which are prepared under equivalent conditions demonstrate poor drain times. The poor drain times result from inferior flake strength.

What is claimed is:

1. A method of making an improved flaked roast coffee product characterized by increased extractability of the water-soluble flavor constituents and increased initial aroma intensity and comprising coffee flake aggregates, said method comprising the steps of:
   A. Comminuting roast low-moisture coffee beans at a temperature of below 40° F., said low-moisture coffee beans having a moisture content of from about 1% to about 3.5% by weight of said low-moisture coffee beans thereby forming a low-moisture roast and ground coffee;
   B. comminuting roast high-moisture coffee beans at a temperature of below 40° F., said high-moisture coffee beans having a moisture content of about 4.5% to 7% by weight of said high-moisture coffee, thereby forming a high-moisture roast and ground coffee;
   C. Admixing said low-moisture roast and ground coffee and said high-moisture roast and ground coffee at a temperature of below 40° F., the mixture having an average moisture content of about 3% to 5% by weight;
   D. passing the coffee mixture of step (C) through a roll mill at a feed rate of about 10 lbs./hr.-inch of nip to 400 lbs./hr.-inch of nip, said roll mill having
      I. a roll pressure of from about 150 lbs./in. of nip to about 4000 lbs./in. of nip,
      II. a roll temperature of from about 40° F. to about 80° F.,
      III. a static gap setting of less than 0.001 inch,
      IV. a roll peripheral speed of from about 470 ft./min. to 1880 ft./min., and
      V. a roll diameter of from about 6 inches to 48 inches, to produce coffee flake aggregates having a flake thickness of about 0.009 inch to 0.016 inch;
   and thereafter
   E. screening said coffee flake aggregates to produce a flaked roast coffee product such that no more than 60% by weight of said product passes through a U.S. Standard 30 mesh screen.

2. A process according to claim 1 wherein the particle size distribution of said coffee mixture is such that
   (a) from 0% to about 80% by weight of the roll mill coffee feed is retained on a 12 mesh U.S. Standard size screen,
   (b) from about 0% to 40% by weight of the roll mill coffee feed (goes through 12 but) is retained on a 16 mesh U.S. Standard screen, and
   (c) from about 0% to 45% by weight of the roll mill coffee feed (goes through 16 but) is retained on a 20 mesh U.S. Standard size screen,
   (d) from 0% to 55% by weight of the roll mill coffee feed (goes through 20 but) is retained on a 30-mesh U.S. Standard size screen, and
   (e) from 0% to 40% by weight of the roll mill coffee feed goes through a 30 mesh U.S. Standard size screen.

3. The process of claim 2 wherein the low-moisture coffee beans have a moisture content of from about 1.5% to 2.5% by weight of said low-moisture coffee and wherein the high-moisture coffee has a moisture content of from about 5.5% to 6.5% by weight of the high-moisture coffee.

4. The process of claim 3 wherein the coffee mixture of step (c) has an average moisture content of 3.5% to 4.5%.

5. The process of claim 4 wherein the comminuting of the roast low-moisture coffee beans and the comminuting of the roast high-moisture coffee beans is each at a temperature of between 20° F. and 35° F.

6. The process of claim 5 wherein the roll mill is operated at a zero static gap.

7. The process of claim 6 wherein the roll mill has
   I. a roll pressure of from about 1,000 lbs./linear inch of nip to 2,000 lbs./linear inch of nip,
   II. a roll temperature of about 60° F. to 70° F., and
   III. a roll peripheral speed of from about 1180 ft./min. to 1650 ft./min.

8. The process of claim 7 wherein the low-moisture coffee beans and the high-moisture coffee beans are each separately comminuted along with frozen carbon dioxide in a weight ratio of beans to carbon dioxide of about 6:1, said carbon dioxide having a particle size of less than about 0.25 inch in diameter.

9. The process of claim 8 wherein the low-moisture coffee beans have a moisture content of 2% by weight of said beans and wherein the high-moisture coffee beans have a moisture content of 6% by weight.

10. The product produced by the process of claim 1.

* * * * *